US005676503A

United States Patent [19]

Lang

[11] Patent Number: 5,676,503

[45] Date of Patent: Oct. 14, 1997

[54] DRILL STAND WITH AN AUTOMATIC ADVANCEMENT DEVICE FOR A DRILLING MACHINE

[76] Inventor: Armand Lang, 7, Rue de Wecker, 6830 Berbourg, Luxembourg

[21] Appl. No.: 650,617

[22] Filed: May 20, 1996

[51] Int. Cl.$^6$ ........................ B23B 45/14

[52] U.S. Cl. ........................ 408/234; 408/129; 408/712

[58] Field of Search ........................ 408/234, 712, 408/99, 129

[56] References Cited

U.S. PATENT DOCUMENTS

| | | | |
|---|---|---|---|
| 2,405,110 | 8/1946 | Bullock | 408/136 |
| 2,947,204 | 8/1960 | Pine et al. | 408/129 |
| 4,523,882 | 6/1985 | Hengesbach | 408/234 |
| 5,137,235 | 8/1992 | Wentworth et al. | 408/129 |

FOREIGN PATENT DOCUMENTS

| | | | |
|---|---|---|---|
| 2643598 | 3/1978 | Germany | 408/712 |
| 2630446 | 7/1978 | Germany . | |

*Primary Examiner*—Steven C. Bishop
*Attorney, Agent, or Firm*—Thomas S. Baker, Jr.

[57] ABSTRACT

A drill stand for a hand-held drilling machine (30) has a length-variable support (2, 4), on which a clamping chuck (20) for the drilling machine (30) is mounted in a displaceable manner. A spring (50) presses the drilling machine (30) in the advancement direction. The drilling machine (30) is raised, via the spring (50), by means of an adjustable adjustment unit (40) on the support (2, 4), and the spring (50) is compressed in order to produce the advancement force.

12 Claims, 3 Drawing Sheets

DRILL STAND WITH AN AUTOMATIC ADVANCEMENT DEVICE FOR A DRILLING MACHINE

Figure 1:
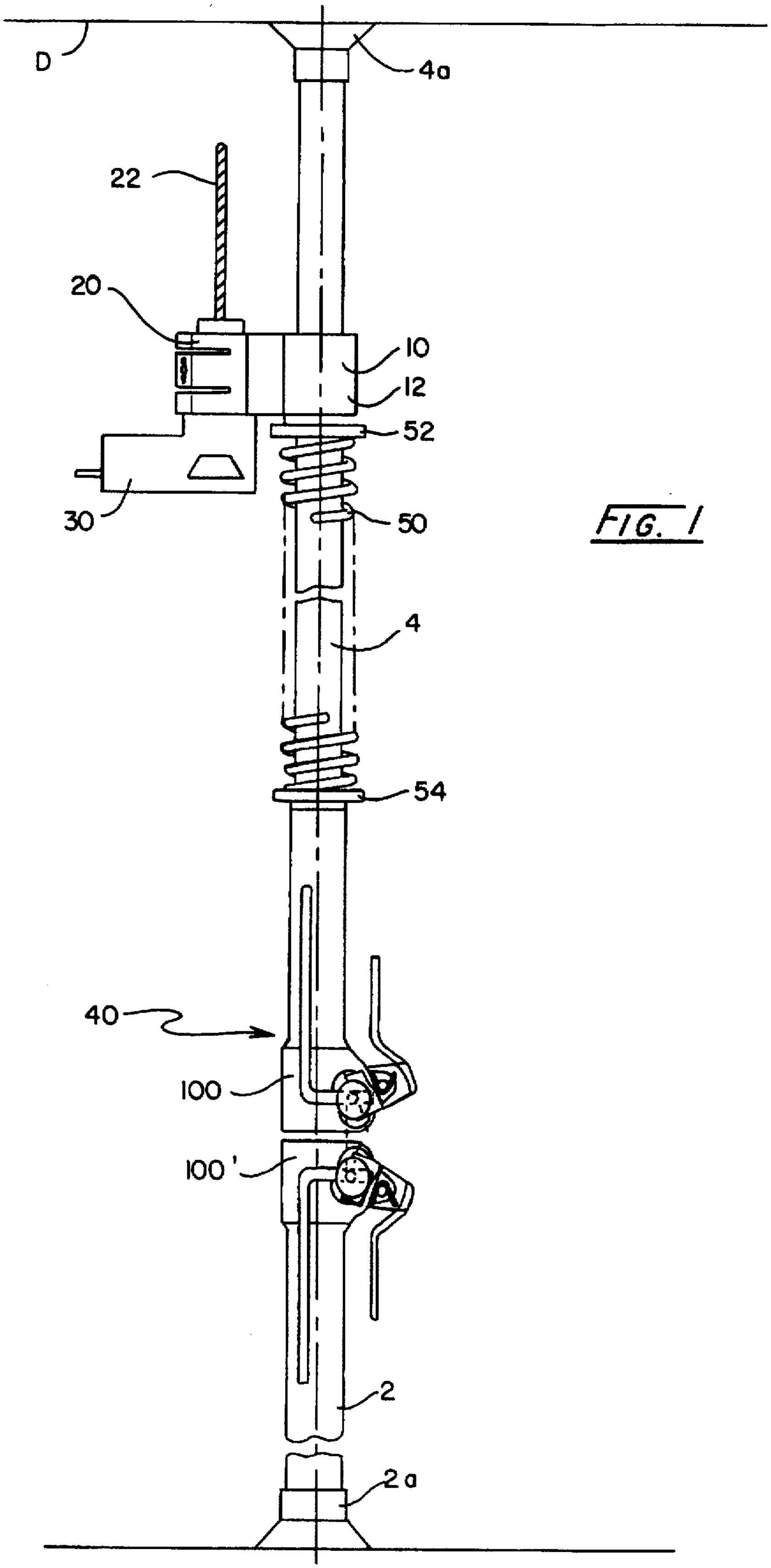

The invention relates to a drill stand, with an automatic advancement device, for a drilling machine, especially for producing drilled holes in concrete ceilings or the like.

Concrete ceilings are usually drilled through from the bottom to the top in order that the dust from the drilling operation can fall continuously and freely out of the drilled hole by gravitational force. The drilling work requires a lot of force since the drilling machine has to be pressed manually upward from below. In doing so, the worker is, at the same time, exposed to drilling dust that falls out of the drilled hole. As a consequence of the long drill which tends to vibrate, such work is not without danger, and injuries to one's health can also occur as a result of inhaling the dust.

Drill stands with an automatic hydraulic advancement device to press the drilling machine against a concrete ceiling are already known. Such hydraulic advancement devices are expensive from the design standpoint and are, accordingly, costly to purchase. Consequently, they are suitable only for relatively big, heavy drilling machines for producing large diameter holes in concrete. Hydraulic advancement devices have not, therefore, been used previously in conjunction with hand-operated drilling machines for drilling smaller holes in concrete ceilings.

It is also already known that one can provide a drill stand with a pivotable lever in order to press a drilling machine against a concrete ceiling from below. Although this does make a simpler operation possible, the worker is still exposed to the dust that falls out of the drilled hole.

The object of the invention is to create a portable, simple and light drill stand with an automatic advancement device for a hand-operated drilling machine in order to be able to produce holes in concrete while avoiding the aforementioned disadvantages—without the exertion of manual force and without the inconvenience of the dust.

In order to attain this object, the invention provides a drill stand with a length-variable support, consisting of two telescopically adjustable rods with an axially displaceable supporting device for a drilling machine mounted on one of the two rods, and an adjustment unit which is axially movable and lockable on the rod for advancing the supporting device in the direction of the drilling site via a compression advancement spring that is arranged between the supporting device and the adjustment unit, whereby on applying the drill bit that is clamped in the drilling machine to the drilling site, an advancement force must be exerted on the supporting device via the adjustment unit, by compressing the compression advancement spring.

In order to produce a hole in concrete, the drill stand is set up between the floor and the concrete ceiling and adjusted to the height of the room by changing its length and, finally, clamped firmly between the floor and the ceiling. Then, by activating the adjustment unit, the supporting device, together with the drilling machine, is displaced upward via the compression advancement spring until the drill makes contact with the ceiling. The adjustment unit is then moved further upward as a result of which the spring is compressed until it presses the drill against the ceiling with the required force of advancement. The drill stand is now set up ready for use and the drilling machine can be switched on via remote control. After the ceiling has been drilled through, the drilling machine is switched off again via remote control and the adjustment unit is moved downward again in order to relieve the tension in the compression advancement spring and to remove the drilling machine from the drilling site. Drilling through concrete can therefore be performed without manual exertion and free from the nuisance of the dust by using a simple drill stand.

Commercially available supports of adjustable length, such as those used for the erection of boarding or planking can be used as drill stands. These supports usually consist of a lower standing tube or a lower rod inside of which an upper rod is accommodated in a manner that permits displacement. In addition, these known supports have a device for changing the length of the support. It is merely necessary to provide the supporting device for the drilling machine, the adjustment unit and the compression advancement spring on the upper rod. Here, the compression advancement spring can be a helical spring which is arranged around the drilling rod.

In order to raise the supporting device together with the drilling machine and to compress the compression advancement spring, the adjustment unit can have, on the upper rod, a threaded collar which sits on a threaded section of the upper rod. After raising the supporting device together with the drilling machine and compressing the compression advancement spring, the threaded collar can be locked onto the upper rod.

Preferably, however, the adjustment unit has a first adjustment head, displaceable on the rod, in which a rotatable friction roller is mounted which can be wedged under load in a self-restraining manner between a bearing surface on the rod and oblique surfaces of the adjustment head and is spring-loaded in the direction of the wedging site, whereby, as a result of driving the friction roller from the outside, the adjustment head is to be displaced onto the rod in order to advance the supporting device to the drilling site and to compress the compression advancement spring, and where the friction roller is movable, counter to the spring loading and away from the wedging site in order to relieve the tension in the compression advancement spring on the rod by displacement in the opposite direction of the adjustment head, and to move the supporting device away from the drilling site. The friction roller can be mounted in elongated holes that are arranged obliquely to the longitudinal axis of the support and are grasped on both sides of the adjustment head by a guidance element equipped with a handle, whereby the oblique surfaces are formed by the lateral surfaces of elongated holes which converge in the advancement direction toward the bearing surface of the rod, and a spring is located between the guidance component and the adjustment head which presses the friction roller toward the wedging site.

The device for changing the length of the support can consist of a friction drive with a second adjustment head which is molded onto the lower rod. An adjustment head with a friction drive for a length-adjustable support is described in DE-PS 26 30 446, for example. The second adjustment head contains a rotatable friction roller which is capable of being wedged in a self-restraining manner, under the load of the upper rod, between a bearing surface of the upper rod and oblique surfaces of the adjustment head, and is spring-loaded in the direction of the wedging site. The support is lengthened in this way by the driving force of the friction roller via the outward movement of the upper rod from the lower rod; for shortening the length of the support, the friction roller is moved away from the wedging site, against the spring loading, as a result of which the upper rod can simply be pushed back into the lower rod.

However, instead of this second adjustment head with a friction drive, it is also possible to provide a screw-type connection between the two rods and to adjust the rods to the required length by rotating them relative to one another and then locking the rods by means of a pin or similar device. Finally, it would also be conceivable to provide a rod with two diametrically opposed boreholes and to install a series of axially spaced drilled holes in the other rod and, in order to adjust the support to the required length, to insert a pin through boreholes, aligned with one another, in the two rods. In this case, the support must be braced by underlay wedges or the like between the floor and the ceiling.

The first adjustment head for the supporting device for the drilling machine and the second adjustment head for changing the length of the support are, in essence, constructed identically with the exception that the first adjustment head is displaceable on one of the rods (the inner, upper rod) and the second adjustable head is molded onto the other rod (outer, lower rod) by welding it on, for example. In addition, the oblique wedge surfaces of the first adjustment head converge toward the bearing surface of the inner rod in an upward direction toward the compression advancement spring, whereas the oblique wedge surfaces of the second adjustment head converge in the opposite direction toward the bearing surface of the inner rod. The two adjustment heads are thus arranged in a manner in which they are rotated by 180° relative to one another.

An example of an embodiment of the invention is illustrated in the drawings and is described more comprehensively in the following section. Shown are:

FIG. 1: An illustration of the drill stand in accordance with the invention together with a drilling machine that is clamped in the supporting device.

Figure 2:
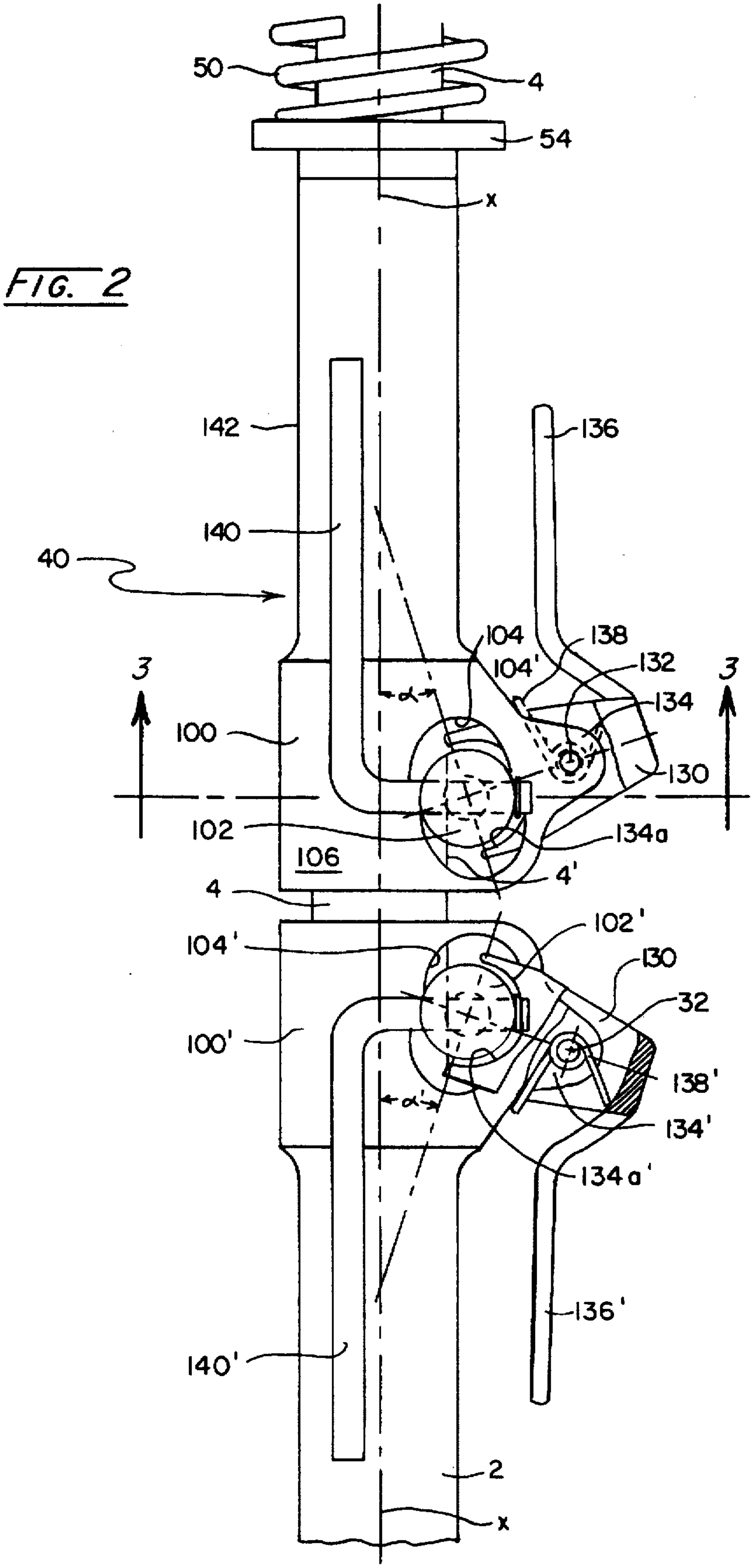

FIG. 2: An enlarged illustration of the adjustment heads for changing the length of the support and for raising the supporting device and for pre-tensioning the compression advancement spring.

Figure 3:
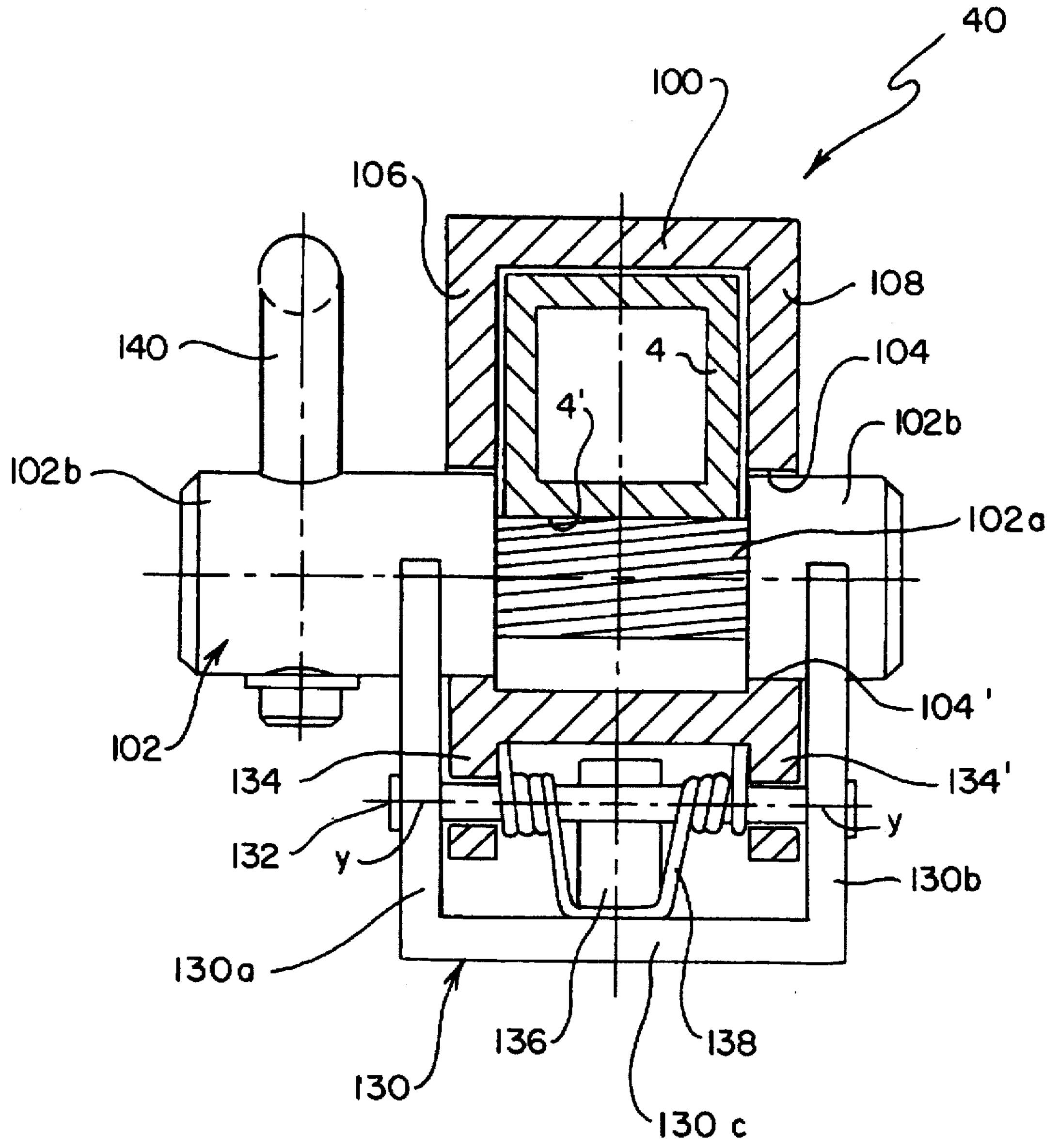

FIG. 3: A sectional illustration along the line 3—3 in accordance with FIG. 2.

As illustrated in FIG. 1, the drill stand has a lower, outer, hollow rod 2 and an upper, inner, hollow rod 4 that is telescopically accommodated in the lower, inner rod. In order to change the length of the support, the rods 2 and 4 are longitudinally displaced relative to one another. At its lower end, the lower rod 2 has a widened foot part 2a; the upper rod has a widened head part 4a at its upper end.

A supporting device 10, together with a clamping chuck 20 for a drilling machine 30, is arranged on the upper rod 4 in a manner that permits displacement. The supporting device 10 has a casing 12 that is adapted in its cross-sectional shape to the cross-sectional shape of the rod 4. The two rods 2 and 4 preferably have a square shape; other shapes such as, for example, circular rods are also conceivable. For a precise adjustment of the drilling machine 30, the clamping chuck 20 can be adjustable in the radial and peripheral direction in relation to the support. Beneath the supporting device 10, an adjustment unit 40 is provided on the upper rod 4 which is capable of being locked onto the rod 4. A compression advancement spring 50 is arranged on the upper rod 4 between the adjustment unit 40 and the supporting unit 10. A first spring seating washer 52 is located between the upper end of the spring 50 and the supporting device 10; a second spring seating washer 54 is located between the lower end of the spring 50 and the adjustment unit 40. By displacing the adjustment unit 40 upward on the rod 4, the spring 50 together with the supporting device 10 and the drilling machine 30 are raised until the drill bit 22 that is clamped in the drilling machine makes contact with the ceiling D at the site that is to be drilled through and then, by further pressing the lower end of the spring 50 upward via the adjustment unit 40, the spring is compressed in order to press the drill against the ceiling D with the required force of advancement.

The adjustment unit 40 will now be described more comprehensively with reference being made to FIGS. 2 and 3. The adjustment unit 40 has a first adjustment head 100 with a friction drive. The friction drive has a friction roller 102 mounted in elongated holes 104 in the front wall 106 and in the rear wall 108 of the adjustment head 100. The elongated holes 104 are arranged at an acute angle α relative to the longitudinal x—x axis of the support, whereby the tip of the angle is oriented in the direction of the head part 4a of the upper inner rod 4. The friction roller 102 has a middle part 102a that is adjacent to the bearing surface 4' of the inner upper rod 4. At both sides of the middle part 102a, the friction roller 102 has end parts 102b of a larger diameter which overlap opposite lateral faces of the upper inner rod 4 and are accommodated and mounted in the elongated holes 104, in a manner permitting displacement. The adjustment head 100 is pressed downward by means of the compression advancement spring 50 and the friction roller 102 is wedged or locked between the bearing surface 4' of the upper inner rod 4 and the wedge surfaces 104' of the elongated holes 104, that are turned toward and lie opposite the bearing surface 4', by means of the oblique wedge surfaces 104' of the elongated holes 104 which converge upward toward the bearing surface 4' of the upper rod 4.

At the adjustment head 100, a guidance element 130 is mounted in a manner that permits pivoting about a horizontal y—y axis by means of a pivoting pin 132 at shoulders 134. The guidance element 130 is U-shaped with two shanks 130a, 130b that overlap the front wall 106 or, as the case may be, the rear wall 108 of the adjustment head 100 and are provided at their free end with semi-circular recesses 134a which accommodate the end parts 102b of the friction roller 104. In FIGS. 1 and 2, the front leg 103a is illustrated in a broken-open or broken-away form. A handle 136 is provided at the bar 130c of the U-shaped guidance element 130. A helical spring 138 sits on the pivoting pin 132 and presses the guidance element 130 in clockwise direction and, accordingly, presses the friction roller 102 in the elongated holes 104 upward toward the wedging site between the bearing surface 4' and the wedge surfaces 104'.

A hand crank 140 is accommodated in a pivotable manner in a transverse hole in the friction roller 102. By rotating the hand crank 140 clockwise, the adjustment head 100 is moved upward on the inner rod 4 via the friction roller 102 in order to raise the drilling machine 30 and to compress the compression advancement spring 50. As a result of pushing the handle 136 in the direction of the upper rod 4, the friction roller 102 moves downward in the elongated hole 104 away from the wedging site, and the adjustment head 100 can be moved freely downward on the upper rod in order to relieve the tension in the compression advancement spring 50 and to lower the drilling machine 30. The adjustment head 100 has an extension casing 142 whose cross-section is adapted to the upper rod 4 and is guided on it in a manner that does not permit rotation. The lower spring seating washer 54 is located on the upper end of the extension casing 142.

A second adjustment head 100', see FIGS. 1 and 2, with a friction drive is provided in order for adjusting the length of the support, and which second adjustment head corresponds, in essence, to the first adjustment head 100 for raising the supporting device 10 and to compress the spring 50 with the exception that the second adjustment head 100' is arranged in such a way that it is rotated by 180° relative to the first adjustment head 100, i.e. the tip of angle α' between the longitudinal x—x axis of the support and the longitudinal axis of the elongated holes 104' is oriented toward the lower end of the lower rod 2. Moreover, the second adjustment head 100' is not displaceable on the upper rod 4, but is welded to the lower rod 2. All the other components of the second adjustment head 100' are identical to the components of the first adjustment head 100 so that any further description of these components is unnecessary here.

It should simply be mentioned that, under load, the friction roller 102' of the second lower adjustment head 100' is wedged in a self-restraining manner between the bearing surface 4' of the upper rod 4 and the opposite wedging surfaces of the elongated holes 104'. The helical spring 138' presses the friction roller 102' downward toward the clamping site via the guidance element 130'. In order to lengthen the support, the friction roller 102' is rotated clockwise by means of the manual lever 140'. By pressing the manual lever 136' in the direction of the lower rod 2 and against the spring 138', the friction roller 102' is moved upward and away from the clamping site so that the upper rod 4 can be pushed into the lower rod 2 in order to shorten the support.

The stand can also be used for drilling holes downward into the floor and can also be mounted horizontally in order to drill holes in vertical walls.

I claim:

1. Drill stand adapted to mount a drill, having a variable-length pillar-type support, comprising two telescopically adjustable rods adapted to engage two fixed surfaces of a drilling site, a drilling machine supporting device axially displaceably mounted on one of the two rods, an adjustment unit axially movable and lockable on said one rod, and a compression advancement spring arranged on said one rod between said supporting device and said adjustment unit whereby axial displacement of said adjustment unit on said one rod towards said drilling machine supporting device causes said compression advancement spring to be preloaded when said drill engages a surface to be drilled and thereby causes said supporting device and said drilling machine supported thereto to slide along said one rod in a drill advance direction during the drilling operation.

2. Drill stand in accordance with claim 1, where the compression advancement spring is a helical spring arranged around the one rod.

3. Drill stand in accordance with claim 1, where the adjustment unit has an adjustment head that is displaceable on the one rod, in which a rotatable friction roller is bearing-mounted which can be wedged, under load by the compression advancement spring, in a self-restraining manner, between a bearing surface of the one rod and oblique surfaces of the adjustment head and is spring-loaded in the direction of the wedging site, whereby, as a result of driving the friction roller from outside, the adjustment head is to be displaced onto the one rod in order to advance the supporting device to the drilling site and to compress the compression advancement spring, and the friction roller is movable, against the spring loading, away from the wedging site in order to relieve the tension in the compression advancement spring by displacement, in the opposite direction, of the adjustment head on the one rod and to move the supporting device away from the drilling site.

4. Drill stand in accordance with claim 2, where the adjustment unit has an adjustment head that is displaceable on the one rod, in which a rotatable friction roller is bearing-mounted which can be wedged, under load by the compression advancement spring, in a self-restraining manner, between a bearing surface of the one rod and oblique surfaces of the adjustment head and is spring-loaded in the direction of the wedging site, whereby, as a result of driving the friction roller from outside, the adjustment head is to be displaced onto the one rod in order to advance the supporting device to the drilling site and to compress the compression advancement spring, and the friction roller is movable, against the spring loading, away from the wedging site in order to relieve the tension in the compression advancement spring by displacement, in the opposite direction, of the adjustment head on the one rod and to move the supporting device away from the drilling site.

5. Drill stand in accordance with claim 3, where the friction roller is mounted in bearings in elongated holes that are arranged obliquely to the longitudinal axis of the support and is grasped on both sides of the adjustment head by a guidance element which is equipped with a handle, whereby the oblique surfaces are formed by the lateral surfaces of the elongated holes that converge, in the advancement direction, toward the bearing surface of the one rod, and a spring is located between the guidance element and the adjustment head, which spring presses the friction roller toward the wedging site.

6. Drill stand in accordance with claim 4, where the friction roller is mounted in bearings in elongated holes that are arranged obliquely to the longitudinal axis of the support and is grasped on both sides of the adjustment head by a guidance element which is equipped with a handle, whereby the oblique surfaces are formed by the lateral surfaces of the elongated holes that converge, in the advancement direction, toward the bearing surface of the one rod, and a spring is located between the guidance element and the adjustment head, which spring presses the friction roller toward the wedging site.

7. Drilling support in accordance with claim 1, whereby, in order to change the length of the pillar-type support, said one of the rods is provided with an adjustment head, in which a rotatable friction roller is mounted in bearings, and whereby the friction roller can be wedged, under the action of the load in a self-restraining manner, via the other rod, between a bearing surface of the other rod and oblique surfaces of the adjustment head and is spring-loaded in the direction of the wedging site, and whereby the pillar-type support is to be lengthened as a result of driving the friction roller from the outside and, in order to shorten the length of the pillar-type support, the friction roller is movable away from the wedging site against the spring-loading.

8. Drilling support in accordance with claim 2, whereby, in order to change the length of the pillar-type support, said one of the rods is provided with an adjustment head, in which a rotatable friction roller is mounted in bearings, and whereby the friction roller can be wedged, under the action of the load in a self-restraining manner, via the other rod, between a bearing surface of the other rod and oblique surfaces of the adjustment head and is spring-loaded in the direction of the wedging site, and whereby the pillar-type support is to be lengthened as a result of driving the friction roller from the outside and, in order to shorten the length of the pillar-type support, the friction roller is movable away from the wedging site against the spring-loading.

9. Drilling support in accordance with claim 3, whereby, in order to change the length of the pillar-type support, said one of the rods is provided with an adjustment head, in which a rotatable friction roller is mounted in bearings, and whereby the friction roller can be wedged, under the action of the load in a self-restraining manner, via the other rod, between a bearing surface of the other rod and oblique surfaces of the adjustment head and is spring-loaded in the direction of the wedging site, and whereby the pillar-type support is to be lengthened as a result of driving the friction roller from the outside and, in order to shorten the length of the pillar-type support, the friction roller is movable away from the wedging site against the spring-loading.

10. Drilling support in accordance with claim 4, whereby, in order to change the length of the pillar-type support, said one of the rods is provided with an adjustment head, in which a rotatable friction roller is mounted in bearings, and whereby the friction roller can be wedged, under the action of the load in a self-restraining manner, via the other rod, between a bearing surface of the other rod and oblique surfaces of the adjustment head and is spring-loaded in the direction of the wedging site, and whereby the pillar-type support is to be lengthened as a result of driving the friction roller from the outside and, in order to shorten the length of the pillar-type support, the friction roller is movable away from the wedging site against the spring-loading.

11. Drilling support in accordance with claim 5, whereby, in order to change the length of the pillar-type support, said one of the rods is provided with an adjustment head, in which a rotatable friction roller is mounted in bearings, and whereby the friction roller can be wedged, under the action of the load in a self-restraining manner, via the other rod, between a bearing surface of the other rod and oblique surfaces of the adjustment head and is spring-loaded in the direction of the wedging site, and whereby the pillar-type support is to be lengthened as a result of driving the friction roller from the outside and, in order to shorten the length of the pillar-type support, the friction roller is movable away from the wedging site against the spring-loading.

12. Drilling support in accordance with claim 6, whereby, in order to change the length of the pillar-type support, said one of the rods is provided with an adjustment head, in which a rotatable friction roller is mounted in bearings, and whereby the friction roller can be wedged, under the action of the load in a self-restraining manner, via the other rod, between a bearing surface of the other rod and oblique surfaces of the adjustment head and is spring-loaded in the direction of the wedging site, and whereby the pillar-type support is to be lengthened as a result of driving the friction roller from the outside and, in order to shorten the length of the pillar-type support, the friction roller is movable away from the wedging site against the spring-loading.

* * * * *